United States Patent [19]
Belsky et al.

[11] 3,870,716
[45] Mar. 11, 1975

[54] PROCESS FOR PRODUCTION OF ALKYLENE OXIDE ADDUCTS OF TRIS(2-HYDROXYALKYL)ISOCYANURATE

[75] Inventors: Stephen Edward Belsky, Parsippany; John Henry Bonfield, Basking Ridge, both of N.J.

[73] Assignee: Allied Chemical Corporation, New York, N.Y.

[22] Filed: Oct. 2, 1972

[21] Appl. No.: 294,062

Related U.S. Application Data

[63] Continuation-in-part of Ser. No. 126,884, March 22, 1971, Pat. No. 3,726,871, which is a continuation-in-part of Ser. No. 39,855, May 20, 1970, abandoned.

[52] U.S. Cl.......... 260/248 NS, 260/2.5 A, 260/868, 260/835
[51] Int. Cl............................................. C07d 55/38
[58] Field of Search............................. 260/248 NS

[56] References Cited
UNITED STATES PATENTS

| | | |
|---|---|---|
| 3,016,404 | 1/1962 | Beauchamp et al. ............ 260/248 X |
| 3,088,948 | 5/1963 | Little et al. ............................ 260/248 |
| 3,121,082 | 2/1964 | Guttag .................................... 260/248 |
| 3,179,686 | 4/1965 | Covey et al. ..................... 260/248 X |
| 3,231,577 | 1/1966 | Walles ............................. 260/248 X |
| 3,637,557 | 1/1972 | Little ...................................... 260/248 |

*Primary Examiner*—John M. Ford
*Attorney, Agent, or Firm*—Michael S. Jarosz

[57] ABSTRACT

Alkylene oxide adducts of tris(2-hydroxyalkyl) isocyanurate are prepared directly from cyanuric acid and alkylene oxide in a two-step process comprising using an alkaline or preferably a quaternary ammonium halide catalyst for conversion of the cyanuric acid to tris-(2-hydroxyalkyl)isocyanurate, followed by an acid catalyst for conversion of the tris(2-hydroxyalkyl)isocyanurate to the polyether polyol. Preferably, the product of the reaction is used as the reaction solvent, although other reaction solvents including tris(2-hydroxyalkyl)isocyanurate may be used. The adducts are useful as cross-linking agents in polyurethane foams and as polyols in alkyd and polyester resins.

11 Claims, No Drawings

PROCESS FOR PRODUCTION OF ALKYLENE OXIDE ADDUCTS OF TRIS(2-HYDROXYALKYL)ISOCYANURATE

CROSS-REFERENCES TO RELATED APPLICATIONS

This application is a Continuation-in-Part application of our application Ser. No. 126,884, filed Mar. 22, 1971, now U.S. Pat. No. 3,726,871, which in turn is a Continuation-in-Part of abandoned application Ser. No. 39,855, filed May 20, 1970.

The present invention is an improvement over the process for preparing alkylene oxide adducts of tris(2-hydroxyalkyl)isocyanurate disclosed in U.S. application Ser. No. 101,130 filed Dec. 23, 1970.

BACKGROUND OF THE INVENTION

This invention relates to alkylene oxide adducts of tris(2-hydroxyalkyl)isocyanurate; in particular, it relates to a process for preparation of alkylene oxide adducts of tris(2-hydroxyalkyl)isocyanurate directly from cyanuric acid and alkylene oxide.

Tris(2-hydroxyalkyl)isocyanurates and polyesters derived therefrom are known in the literature; for example, U.S. Pat. No. 3,088,948 discloses tris(2-hydroxyethyl)isocyanurate and its homologues, and U.S. Pat. No. 3,477,966 discloses polyesters derived therefrom using various dicarboxylic acids. Unfortunately, these patents do not provide a means of modifying the tris(2-hydroxyalkyl)isocyanurates to take advantage of varied physical and chemical properties.

U.S. Pat. No. 3,265,694 relates to a process for oxyalkylating cyanuric acid comprising reacting cyanuric acid with at least three molecular equivalents of an alkylene oxide in the presence of an acid catalyst. However, we have found that the formation of alkylene oxide adducts of tris(2-hydroxyalkyl)isocyanurate from alkylene oxide and cyanuric acid is a combination of reactions for which different catalysts are applicable to obtain maximum yields.

It has also been suggested to prepare alkylene oxide adducts of tris(2-hydroxyalkyl)isocyanurate by reacting alkylene oxide with molten tris(2-hydroxyalkyl)isocyanurate in the presence of an acid catalyst. In this process the purity of the tris(2-hydroxyalkyl)isocyanurate is critical because low purity causes degradation of the isocyanurate to form impurities which accelerate the degradation. Thus, it is necessary to make, isolate and purify the tris(2-hydroxyalkyl)isocyanurate before the alkylene oxide addition can be made.

SUMMARY OF THE INVENTION

In accordance with the present invention, we provide an improved process for the preparation of a compound having the formula:

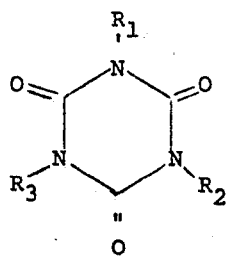

wherein $R_1$ is a hydrogen-terminated oxyalkylene chain of from 2 to 30 oxyalkylene units, and $R_2$ and $R_3$ are each a hydrogen-terminated oxyalkylene chain of from 1 to 30 oxyalkylene units.

Each oxyalkylene unit has the formula $$-CH_2CHO-$$
$$\quad\quad |$$
$$\quad\quad R$$

wherein R at each occurrence independently is hydrogen, methyl, or ethyl. Said process comprises the following steps:

a. reacting cyanuric acid with about three molecular equivalents of alkylene oxide of the formula:

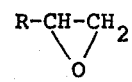

wherein R has the meaning given above, in the presence of a catalyst selected from the group consisting of alkaline catalysts and quaternary ammonium halides, preferably the latter, at a temperature of about 80°C. to 165°C., preferably 100°C. to 150°C., to produce tris-(2-hydroxyalkyl)isocyanurate; and (b) reacting the tris(2-hydroxyalkyl)isocyanurate with at least an equimolar amount of alkylene oxide of the formula:

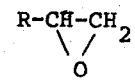

wherein R has the meaning given above, in the presence of an acid catalyst at a temperature of about 80°C. to 165°C., preferably 100°C. to 150°C. It is preferred to make use of the reaction product as the solvent for the reaction. In batch operation, this is conveniently accomplished by leaving part of each batch in the reactor as solvent for the following batch.

The compounds prepared in accordance with the instant invention are hereinafter referred to as hydroxyalkylated isocyanurates.

Polyesters derived from the instant hydroxylated isocyanurates and a polycarboxylic acid are useful in wire enamels and varnishes, casting resins, and in the preparation of ester-imide copolymers. Hydroxyalkylated isocyanurates having a high oxyalkylene content, i.e., more than about 6 moles of alkylene oxide reacted per mol of tris(2-hydroxyalkyl)isocyanurate, are useful in lubricants, functional fluid applications, cosmetic creams and lotions, etc.

It is very desirable to conduct the reaction in a solvent in order to dilute the reactants and facilitate temperature control. Solvents for tris(2-hydroxyalkyl)isocyanurates may be used such as ketones, alcohols, and ethers; however, in order to keep the process as simple as possible, e.g., to avoid solvent recovery steps, we prefer to utilize the product itself as reaction medium. Thus, compared with prior art methods, the preferred process of the present invention results in (1) lower cost of recovery of product and handling of solvent, and (2) elimination of need for secondary purification of intermediate tris(2-hydroxyalkyl)isocyanurate.

We have obtained maximum yields by using our preferred quaternary ammonium halide catalyst, e.g., benzyltrimethylammonium chloride. We have discovered that our preferred quaternary ammonium halide catalysts produce little or no byproducts in the first step of the process, thereby facilitating a straightforward reaction with high yields in the second step. The amount of said catalyst can be varied as desired or as conditions may require, but ordinarily the catalyst is employed in an amount corresponding to from about 0.05 percent to about 5 percent, by weight, of the cyanuric acid.

Suitable acid catalysts for the second step of the process include various strong mineral acids such as sulfuric acid, phosphoric acid, alkali metal bisulfates, sulfonic acids and hydrochloric acid; the use of sulfuric acid is preferred. Only a small amount of acid catalyst is required. However, if base is used in the first step of the process rather than the preferred quaternary ammonium salt, it will be necessary to add a larger amount of acid catalyst in the second step of the process to achieve acidic conditions. Ordinarily the acid catalyst is employed in an amount corresponding to at least about 0.5 percent, preferably from about 1 percent to about 10 percent, by weight, of the cyanuric acid.

The progress of the reaction may be followed by change in pressure accompanying consumption of the alkylene oxide. Normally, the reaction is complete within 5 hours.

The properties of the polyhydroxyalkylated product will vary according to the amount of alkylene oxide incorporated. For example, as the molecular weight of the product increases, the products change from low melting solids to liquids of decreasing viscosity over a limited range, and then back to low melting solids. When prepared with product as solvent, the material may be recovered by cooling and removal from the reaction vessel. When a different solvent is employed in the reaction, recovery by distillation is convenient; however, as noted above this would add to the cost of operation.

The hydroxyalkylated isocyanurates of this invention are useful for a variety of purposes, depending upon the alkylene oxide content of the particular compound. For example, compounds with a high level of alkylene oxide, i.e., greater than about 6 moles of alkylene oxide per mole of tris(2-hydroxyalkyl)isocyanurate, are useful in lubricants, cosmetic creams and lotions, functional fluids for transmitting heat, pressure, etc., and in the synthesis of polyurethane foams and casting resins by reaction with diisocyanates, either with or without modifying diols and triols. In preparing these polyurethanes, standard catalysts such as tertiary amines may be used, and also blowing agents if a cellular structure is desired.

Polyesters may also be prepared from the instant hydroxyalkylated isocyanurates by reaction with polycarboxylic acids. Polyesters derived from those products of 1-6 moles of alkylene oxide per mol of tris(2-hydroxyalkyl)isocyanurate are preferred for their flexibility, adhesion, chemical resistance and dielectric properties, which make them valuable in wire enamels, varnishes, and in alkyd compounds.

DESCRIPTION OF THE PREFERRED EMBODIMENTS

The following examples are provided to more fully illustrate the present invention. All parts and percentages are by weight unless otherwise specified. Viscosities are determined at 25°C. using a Brookfield viscometer.

As previously stated, we prefer to use the product itself as the reaction medium. To obtain the first batch of product, one of the other solvents may be used. Alternatively, alkylene oxide adducts of tris(2-hydroxyalkyl)isocyanurate may be prepared using the process of copending U.S. application Ser. No. 101,130 filed Dec. 23, 1970. Example 1 below demonstrates a suitable procedure in accordance with said copending application.

EXAMPLE 1

Into a stainless steel autoclave, which was provided with a stirrer, was charged tris(2-hydroxyethyl)isocyanurate (75 parts), which had been recrystallized from methanol, and 0.8 part of concentrated sulfuric acid. The mixture was heated to 135°C. to obtain fusion, and then liquid ethylene oxide was added under nitrogen pressure. The reaction temperature was maintained at 134°–140°C. and the pressure ranged between 25 and 75 psi. The progress of the reaction was followed by the drop in pressure. After 2–3 hours, the reaction mixture was cooled and 152 parts of clear, viscous material was removed from the autoclave, indicating that 38 parts of ethylene oxide had reacted, to afford hydroxyethylated isocyanurate of the formula:

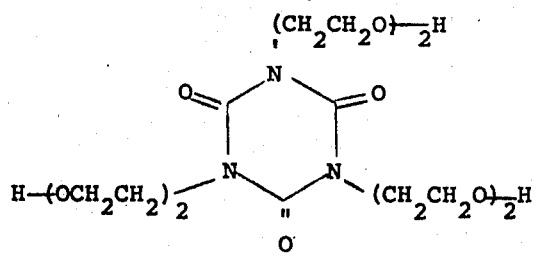

Viscosity of the product was 72,000 centipoises at 25°C. It will be understood that more or less ethylene oxide may be added depending on the product desired.

EXAMPLE 2

To 230 parts of hydroxyethylated isocyanurate prepared in accordance with the procedure of Example 1 were added 104 parts of cyanuric acid and 2.5 parts of benzyltrimethylammonium chloride. These materials were heated to 120°C. in a stirred autoclave and ethylene oxide was added to bring the pressure to 40 psi. The reaction temperature was held at 120° to 125°C., and ethylene oxide was added incrementally to keep the pressure between 30 psi and 40 psi until 107 parts of ethylene oxide had been added (1.5 hours after beginning of reaction), at which time the cyanuric acid had gone completely into solution. After the pressure had dropped to 5 psi, about 5 parts of concentrated sulfuric acid was added. Ethylene oxide addition was restarted and pressure was held at 40 psi to 50 psi until 106 parts of ethylene oxide were added, which required an additional 1.5 hours. After the pressure had dropped to 10 psi, the product hydroxyethylated isocyanurate was cooled to 25°C. The product had a viscosity of 67,000 cps and analyzed 11.4 percent hydroxyl. The product was neutralized with sodium carbonate and filtered. The pH of a 10 percent aqueous solution before neutralization was 2.72.

EXAMPLE 3

The procedure of Example 2 was repeated except that 2 parts of sulfuric acid was added in the second step, instead of 5 parts. The second step of the process required 9.5 hours, and the resulting hydroxyethylated isocyanurate product had a viscosity of 53,000. The pH of a 10 percent aqueous solution of the product was 4.2.

EXAMPLE 4

The procedure of Example 2 was followed except that no sulfuric acid catalyst was used. During the second part of the reaction, the reaction mixture became base catalyzed due to decomposition of the tris(2-hydroxyethyl)isocyanurate. Viscosity of the product was only 1,800 cps and the pH of a 10 percent aqueous solution was 9.8. This example shows the importance of adding acid catalyst to prepare the hydroxyethylated isocyanurates of the present invention.

EXAMPLE 5

The procedure of Example 2 was followed except that the product of Example 2 was used as the reaction solvent instead of the product of Example 1. The product hydroxyethylated isocyanurate was substantially the same as that produced in Example 2.

We claim:

1. In the process for preparing hydroxyalkylated isocyanurate compounds of the formula:

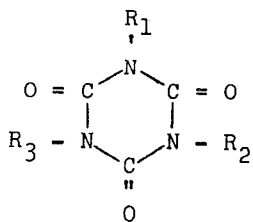

wherein $R_1$ is a hydrogen-terminated oxyalkylene chain of from 2 to 30 oxyalkylene units, and $R_2$ and $R_3$ are each a hydrogen-terminated oxyalkylene chain of from 1 to 30 oxyalkylene units, wherein each oxyalkylene unit has the formula

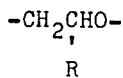

wherein R is hydrogen, methyl or ethyl, by reacting in a reaction vessel tris(2-hydroxyalkyl)isocyanurate wherein said hydroxyalkyl group contains of from 2 to 4 carbon atoms with at least an equimolar amount of an alkylene oxide of the formula:

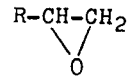

wherein R has the meaning given above, in the presence of an acid catalyst at a temperature of about 80°C to 165°C, the improvement which comprises effecting said reaction in the presence of a hydroxyalkylated isocyanurate compound of the above formula.

2. The process of claim 1 wherein the tris(2-hydroxyalkyl)isocyanurate is obtained by previous reaction in said vessel of cyanuric acid with about three molecular equivalents of an alkylene oxide of the formula:

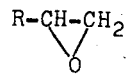

wherein R is hydrogen, methyl or ethyl, in the presence of a catalyst selected from the group consisting of an alkaline catalyst and a quaternary ammonium halide and in the further presence of said hydroxyalkylated isocyanurate compound.

3. The process of claim 2 wherein said catalyst is a quaternary ammonium halide.

4. The process of claim 3 wherein said acid catalyst is a mineral acid.

5. The process of claim 4 wherein the number of mols of alkylene oxide per mol of tris(2-hydroxyalkyl)isocyanurate reacted is from 1 to 6.

6. The process of claim 5 wherein each of the alkylene oxide reactants employed is ethylene oxide.

7. The process of claim 1 wherein the reaction is conducted at a temperature of between about 100°C and 150°C and at a pressure of at least about 10 psi.

8. The process of claim 6 wherein each of said reactions is conducted at a temperature of between about 100°C and 150°C and at a pressure of at least about 10 psi.

9. The process of claim 8 wherein said quaternary ammonium halide catalyst is benzyltrimethylammonium chloride.

10. The process of claim 9 wherein said mineral acid is sulfuric acid.

11. The process of claim 2 wherein at least a minor proportion of the hydroxyalkylated isocyanurate compound reaction product is recycled to said previous reaction between the cyanuric acid and alkylene oxide for use as reaction solvent.

* * * * *

UNITED STATES PATENT AND TRADEMARK OFFICE
CERTIFICATE OF CORRECTION

PATENT NO. : 3,870,716
DATED : March 11, 1975
INVENTOR(S) : Stephen Edward Belsky and John Henry Bonfield It is certified that error appears in the above-identified patent and that said Letters Patent are hereby corrected as shown below:

On the cover page, line 3, change "IRIS" to --TRIS--.

Column 1, line 3, change "IRIS" to --TRIS--.

Column 1, line 27, change "3,477,966" to --3,477,996--.

Signed and Sealed this sixteenth Day of September 1975

[SEAL]

Attest:

RUTH C. MASON
Attesting Officer

C. MARSHALL DANN
Commissioner of Patents and Trademarks